US006301955B1

(12) United States Patent
Cook et al.

(10) Patent No.: US 6,301,955 B1
(45) Date of Patent: Oct. 16, 2001

(54) DRIVER CIRCUIT FOR FUEL VAPOR LEAK DETECTION SYSTEM

(75) Inventors: John E. Cook; William J. Boucher, both of Chatham; Raymond Rasokas, Thamesville, all of (CA)

(73) Assignee: Siemens Canada Limited, Mississauga (CA)

( * ) Notice: Subject to any disclaimer, the term of this patent is extended or adjusted under 35 U.S.C. 154(b) by 0 days.

(21) Appl. No.: 09/238,192

(22) Filed: Jan. 27, 1999

(51) Int. Cl.[7] .............................................. G01M 15/00

(52) U.S. Cl. ........................................ 73/49.7; 73/118.1

(58) Field of Search ................................ 73/39, 40, 46, 73/47, 49.7, 117.2, 117.3, 118.1

(56) References Cited

U.S. PATENT DOCUMENTS

| | | | | | |
|---|---|---|---|---|---|
| 5,146,902 | | 9/1992 | Cook et al. | ........................ | 123/518 |
| 5,383,437 | | 1/1995 | Cook et al. | ........................ | 123/520 |
| 5,411,004 | | 5/1995 | Busato et al. | ........................ | 123/520 |
| 5,474,050 | | 12/1995 | Cook et al. | ........................ | 123/520 |
| 5,499,614 | * | 3/1996 | Busato et al. . | | |
| 5,817,925 | * | 10/1998 | Cook et al. . | | |
| 5,868,120 | * | 2/1999 | Van Wetten et al. . | | |
| 5,957,115 | * | 9/1999 | Busato et al. . | | |
| 5,967,124 | * | 10/1999 | Cook et al. . | | |
| 5,974,861 | * | 11/1999 | Cook et al. . | | |
| 5,987,968 | * | 11/1999 | Cook et al. . | | |
| 6,009,746 | * | 1/2000 | Cook et al. . | | |
| 6,016,691 | * | 1/2000 | Cook et al. . | | |
| 6,016,793 | * | 1/2000 | Cook et al. . | | |
| 6,044,314 | * | 3/2000 | Cook et al. . | | |
| 6,089,081 | * | 7/2000 | Cook et al. . | | |

OTHER PUBLICATIONS

PCT Search Report mailed Nov. 18, 1999 for International Application No. PCT/CA99/00068.

* cited by examiner

*Primary Examiner*—Eric S. McCall

(57) ABSTRACT

An on-board evaporative emission leak detection system has a module (22) for detecting leakage from an evaporative emission space of a fuel system of an automotive vehicle. Interior space (103) of the module's enclosure (102) is communicated to atmosphere. A pump (50) is disposed within space (103) and has an inlet (56) communicated to the interior space and a flow passage (70, 72) at its outlet (58) to allow the pump to create pressure in the evaporative emission space suitable for performance of a leak test. A vent valve (52) is disposed within space (103) and is selectively operable to vent and not vent the flow passage to space (103). An electromagnet actuator (104) has a single electric coil (116) that operates both the pump and the vent valve. A driver circuit (1000) to the coil provides a first current component for operating the pump and a second current component for operating the vent valve.

8 Claims, 10 Drawing Sheets

DRIVER CIRCUIT FOR FUEL VAPOR LEAK DETECTION SYSTEM

REFERENCE TO RELATED APPLICATIONS, INCORPORATION BY REFERENCE, AND PRIORITY CLAIM

This application expressly claims the benefit of earlier filing date and right of priority from the following commonly owned patent applications: U.S. Provisional Application Ser. No. 60/072,842 filed on Jan. 28, 1998 in the names of Cook et al and entitled "LDP2/N.G.C. DRIVER CIRCUIT"; U.S. Provisional Application Ser. No. 60/075,953 filed on Feb. 25, 1998 in the names of Cook et al and entitled "ELECTRIC-OPERATED, PUMP-TYPE VAPOR LEAK DETECTION MODULE"; U.S. Non-Provisional Application Ser. No. 09/065,956 filed on Apr. 24, 1998 and entitled "VAPOR LEAK DETECTION MODULE HAVING A SHARED ELECTROMAGNET COIL FOR OPERATING BOTH PUMP AND VENT VALVE"; U.S. Non-Provisional Application Ser. No. 09/065,964 filed on Apr. 24, 1998 and entitled "VAPOR LEAK DETECTION SYSTEM HAVING A SHARED ELECTROMAGNET COIL FOR OPERATING BOTH PUMP AND VENT VALVE"; U.S. Non-Provisional Application Ser. No. 09/107,517, filed Jun. 30, 1998, entitled "LEAK DETECTION MODULE HAVING ELECTRIC-OPERATED TOGGLE LEVERS FOR PUMP AND VALVE"; U.S. Non-Provisional Application Ser. No. 09/107,519, filed Jun. 30, 1998, entitled "ELECTRIC-OPERATED TOGGLE LEVER OF LEAK DETECTION MODULE PUMP"; and U.S. Non-Provisional Application Ser. No. 09/107,515, filed Jun. 30, 1998, entitled "CALIBRATED TOGGLE LEVER OF LEAK DETECTION MODULE PUMP". The entirety of each of those earlier-filed, co-pending patent applications is hereby expressly incorporated herein by reference.

FIELD OF THE INVENTION

This invention relates generally to an on-board leak detection system for detecting fuel vapor leakage from an evaporative emission space of an automotive vehicle fuel system. More particularly the invention relates to a leak detection system comprising a module that contains a pump and a vent valve which share a common solenoid actuator driven by an electric circuit that produces a drive signal for operating both the pump and the vent valve.

BACKGROUND OF THE INVENTION

A known on-board evaporative emission control system for an automotive vehicle comprises a vapor collection canister that collects volatile fuel vapors generated in the headspace of the fuel tank by the volatilization of liquid fuel in the tank and a purge valve for periodically purging fuel vapors to an intake manifold of the engine. A known type of purge valve, sometimes called a canister purge solenoid (or CPS) valve, comprises a solenoid actuator that is under the control of a microprocessor-based engine management system, sometimes referred to by various names, such as an engine management computer or an engine electronic control unit.

During conditions conducive to purging, evaporative emission space that is cooperatively defined primarily by the tank headspace and the canister is purged to the engine intake manifold through the canister purge valve. A CPS-type valve is opened by a signal from the engine management computer in an amount that allows intake manifold vacuum to draw fuel vapors that are present in the tank headspace and/or stored in the canister for entrainment with combustible mixture passing into the engine's combustion chamber space at a rate consistent with engine operation so as to provide both acceptable vehicle driveability and an acceptable level of exhaust emissions.

Certain governmental regulations require that certain automotive vehicles powered by internal combustion engines which operate on volatile fuels such as gasoline, have evaporative emission control systems equipped with an on-board diagnostic capability for determining if a leak is present in the evaporative emission space. It has heretofore been proposed to make such a determination by temporarily creating a pressure condition in the evaporative emission space which is substantially different from the ambient atmospheric pressure, and then watching for a change in that substantially different pressure which is indicative of a leak.

Two basic types of vapor leak detection systems for determining integrity of an evaporative emission space are: a positive pressure system that performs a test by positively pressurizing an evaporative emission space; and a negative pressure (i.e. vacuum) system that performs a test by negatively pressurizing (i.e. drawing vacuum in) an evaporative emission space.

Commonly owned U.S. Pat. No. 5,146,902 discloses a positive pressure system. Commonly owned U.S. Pat. No. 5,383,437 discloses the use of a reciprocating pump to create positive pressure in the evaporative emission space. Commonly owned U.S. Pat. No. 5,474,050 embodies advantages of the pump of U.S. Pat. No. 5,383,437 while providing certain improvements in the organization and arrangement of a reciprocating pump. The latter patent discloses a leak detection system that comprises an electric-operated pump and an electric-operated vent valve.

SUMMARY OF THE INVENTION

A general aspect of the invention relates to an evaporative emission leak detection system for detecting leakage from an evaporative emission space of a fuel system of an automotive vehicle comprising: a pump comprising a reciprocal pumping mechanism for pumping gaseous fluid with respect to an evaporative emission space; a vent valve that is selectively operable to a first state that vents the evaporative emission space to atmosphere and to a second state that does not vent the evaporative emission space to atmosphere; and an electromechanical actuator for operating both the pump and the vent valve comprising, an electric device comprising an electromagnetic coil for receiving an electric control signal for controlling operation both of the pump and of the vent valve, a first electromechanical coupling operatively coupling the device with the pump such that the pump operation is controlled by the electric control signal, and a second electromechanical coupling operatively coupling the device with the vent valve such that the vent valve operation is controlled by the electric control signal; including an electric circuit providing the electric control signal to the coil wherein the electric circuit comprises a first current path to the coil comprising a controlled conduction device that is connected in series circuit relationship with the coil and is cycled alternately between different states of conductivity to reciprocate the reciprocal pumping mechanism of the pump, and a second current path to the coil comprising an electric circuit component for maintaining a threshold electric current in the coil.

The invention is further characterized by a number of more specific aspects including the controlled conduction device comprising a semiconductor, specifically a field effect transistor; the electric circuit component comprising a resistor; and a sensing circuit that provides a sensed signal for controlling application of a pulse waveform to the controlled conduction device according to pressure sensed in the evaporative emission space.

Another general aspect of the invention relates to an electric circuit for operating a reciprocal pumping mechanism of a pump for pumping gaseous fluid with respect to an evaporative emission space of a fuel system of an automotive vehicle and for operating a vent valve that is selectively operable to a first state for venting the evaporative emission space to atmosphere and to a second state not venting the evaporative emission space to atmosphere, wherein both the pump and the vent valve are operated by respective electromagnetic actuators that share a common electromagnetic coil, the electric circuit comprising: a first current path to the coil comprising a controlled conduction device for connection in series circuit relationship with the coil and cycling alternately between different states of conductivity to reciprocate the reciprocal pumping mechanism of the pump, and a second current path to the coil comprising an electric circuit component for maintaining a threshold electric current in the coil.

Still another general aspect of the invention relates to a method of detecting leakage from an evaporative emission space of a fuel system of an automotive vehicle, the method comprising: operating a pump and a valve from a commonly shared portion of an electromagnet coil that is operated by a driver circuit that comprises a first current path to the coil comprising a controlled conduction device in series circuit relationship with the coil and a second current path to the coil, including cycling the controlled conduction device alternately between different states of conductivity to operate the pump, and maintaining a threshold current in the coil via the second current path.

BRIEF DESCRIPTION OF THE DRAWINGS

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE PREFERRED EMBODIMENT

Figure 1:
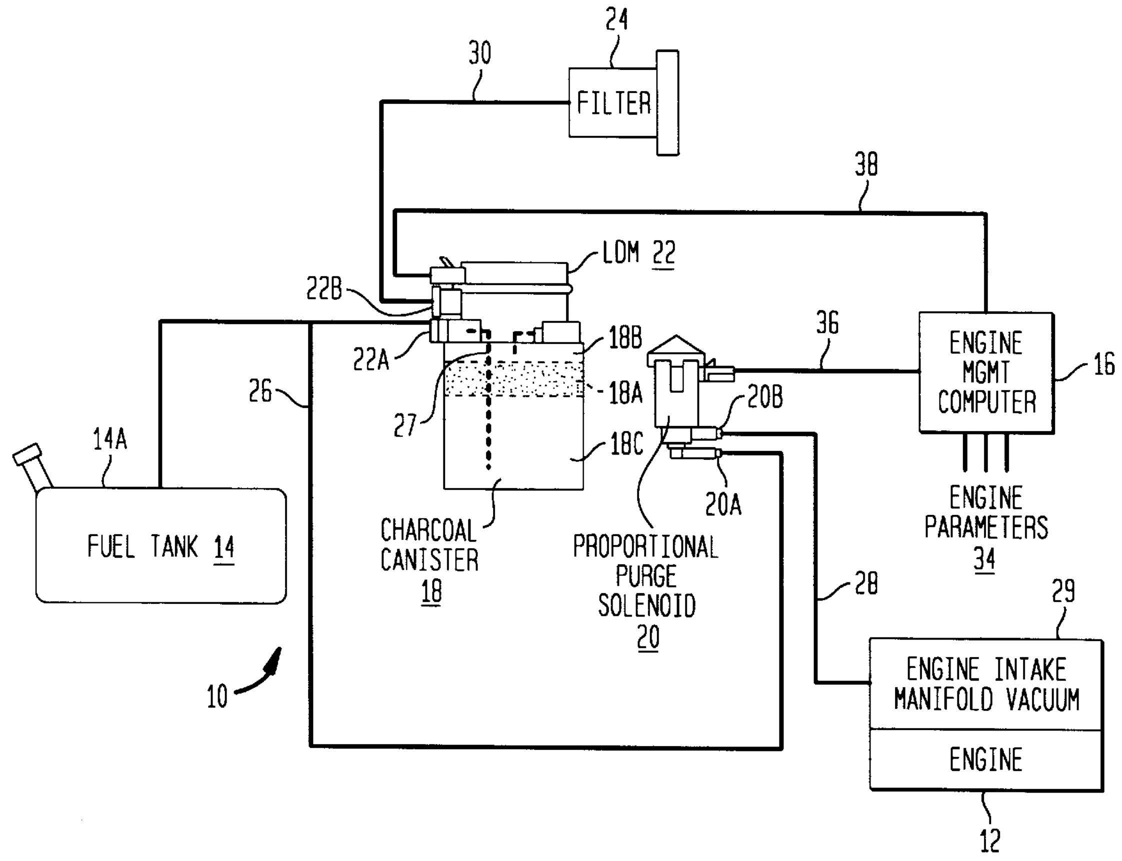
FIG. 1 is a general schematic diagram of an exemplary automotive vehicle evaporative emission control system embodying principles of the invention and comprising a leak detection module (LDM) and a fuel vapor collection canister (charcoal canister) as an integrated assembly.

FIG. 1 shows an automotive vehicle evaporative emission control (EEC) system 10 in association with an internal combustion engine 12 that powers the vehicle, a fuel tank 14 that holds a supply of volatile liquid fuel for the engine, and an engine management computer (EMC) 16 that exercises certain controls over operation of engine 12. EEC system 10 comprises a vapor collection canister (charcoal canister) 18, a proportional purge solenoid (PPS) valve 20, a leak detection module (LDM) 22, and a particulate filter 24. In the illustrated schematic, LDM 22 and canister 18 are portrayed as an integrated assembly, but alternatively they could be two discrete components that are operatively associated by external conduits.

The interior of canister 18 comprises a vapor adsorptive medium 18A that separates a clean air side 18B of the canister's interior from a dirty air side 18C to prevent transpassing of fuel vapor from the latter to the former. An inlet port 20A of PPS valve 20 and a tank headspace port 14A that provides communicates with headspace of fuel tank 14 are placed in common fluid communication with a port 22A of LDM 22 by a fluid passage 26. Interiorly of the integrated assembly of canister 18 and LDM 22, port 22A is communicated with canister dirty air side 18C via a fluid passage 27. Another fluid passage 28 communicates an outlet port 20B of PPS valve 20 with an intake manifold 29 of engine 12. Another fluid passage 30 communicates a port 22B of LDM 22 to atmosphere via filter 24. Another fluid passage 32 that exists interiorly of the integrated assembly of canister 18 and LDM 22 communicates LDM 22 with canister clean air side 18B.

Headspace of tank 14, dirty air side 18C of canister 18, and fluid conduit 26 thereby collectively define an evaporative emission space within which fuel vapors generated by volatilization of fuel in tank 14 are temporarily confined and collected until purged to intake manifold 29 via the opening of PPS valve 20 by EMC 16.

EMC 16 receives a number of inputs, collectively designated 34, (engine-related parameters for example) relevant to control of certain operations of engine 12 and its associated systems, including EEC system 10. One electrical output port of EMC 16 controls PPS valve 20 via an electrical connection 36; other ports of EMC 16 are coupled with LDM 22 via electrical connections, depicted generally by the reference numeral 38.

From time to time, EMC 16 commands LDM 22 to an active state as part of an occasional leak detection test procedure for ascertaining the integrity of EEC system 10, particularly the evaporative emission space that contains volatile fuel vapors, against leakage. During occurrences of such a diagnostic procedure, EMC 16 commands PPS valve 20 to close. At times of engine running other than during such leak detection procedures, LDM 22 reposes in an inactive state, and in doing so provides an open vent path from the evaporative emission space, through itself and filter 24, to atmosphere. This allows the evaporative emission space to breathe, but without allowing escape of fuel vapors to atmosphere due to the presence of vapor collection medium 18A in the vent path to atmosphere.

EMC 16 selectively operates PPS valve 20 such that the valve opens under conditions conducive to purging and closes under conditions not conducive to purging. Thus, during times of operation of the automotive vehicle, the canister purge function is performed in a manner suitable for the particular vehicle and engine so long as the leak detection test procedure is not being performed. When the leak detection test procedure is being performed, the canister purge function is not performed. During a leak detection test, the evaporative emission space is isolated from both atmosphere and the engine intake manifold so that it can be initially positively pressurized by LDM 22, and the pressure thereafter allowed to decay if leakage is present.

Figure 2:
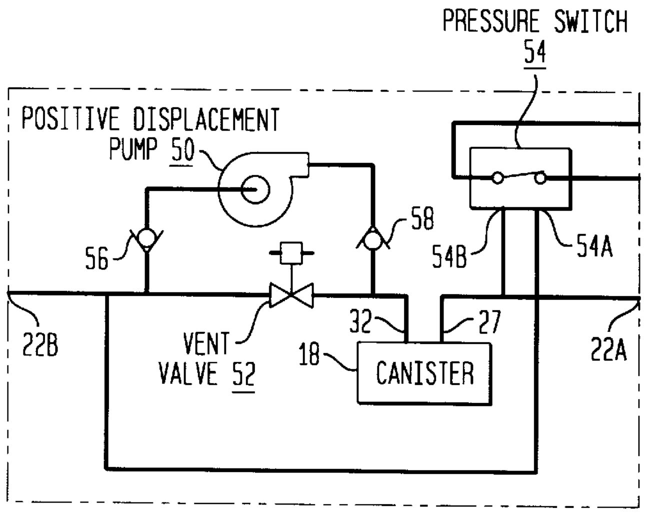
FIG. 2 is schematic diagram of the integrated assembly of FIG. 1.

LDM 22 comprises a positive displacement pump 50, an electric-actuated vent valve 52 and a pressure sensor, such as a pressure switch 54, which are associated with each other, with canister 18, with EEC system 10, and with EMC 16 in the manner presented by FIG. 2. Pump 50 comprises an inlet that is communicated through a one-way valve 56 to port 22B and an outlet that is communicated through a one-way valve 58 and fluid passage 32 to canister clean air side 18B. Vent valve 52 comprises a first port in communication with port 22B and a second port communicated with canister clean air side 18B through fluid conduit 32. Pressure switch 54 comprises a reference port 54A communicated to atmosphere via port 22B and a measuring port 54B communicated to the evaporative emission space via port 22A. Electrically, switch 54 is connected to EMC 16 so that the condition of the switch provides a signal for use by EMC 16.

One-way valves 56, 58 are arranged to allow pump 50 to draw atmospheric air through its inlet and to deliver pumped air through its outlet. Vent valve 52 is normally open, meaning that when not being electrically actuated, it allows the passage of air through itself without significant restriction, and when electrically actuated, it disallows air passage through itself. Switch 54 assumes a first condition, open for example, so long as the pressure at measuring port 54B is less than or equal to a certain positive pressure relative to the pressure at reference port 54A. When the pressure at measuring port 54B is greater than that certain positive pressure, switch 54 assumes a condition, closed for example, different from the first condition.

FIGS. 3–7 show further detail of an exemplary LDM 22. A walled enclosure 102 comprises an open-top container 102A that is sealed closed by a cover 102B to enclose an interior space 103. Container 102A and cover 102B are preferably injection molded plastic parts that fit together in a sealed manner along mating edges 105A, 105B. Pump 50 and valve 52 are disposed within space 103 while switch 54 is disposed on the exterior of cover 102B. Each is suitably secured on enclosure 102.

An electromagnet assembly 104 that serves as a common electric actuator for both pump 50 and vent valve 52 comprises a number of identical E-shaped ferromagnetic laminations stacked together to form a stator 109. As viewed in plan in FIG. 3, stator 109 includes three parallel legs, namely two outer legs 122, 124 of identical width and a somewhat wider middle leg 126, projecting perpendicularly away from a side 127. Electromagnet assembly 104 further comprises an electromagnet 112 that comprises a plastic bobbin 114 containing an electromagnet coil 116. Bobbin 114 fits onto stator middle leg 126 with its axis 119 coincident with that of middle leg 126.

Electromagnet coil 116 comprises a length of magnet wire wound in convolutions around the core of bobbin 114 between axial end flanges of the bobbin. The respective ends of the magnet wire are joined to respective ones of a pair of electric terminals 112A that mount on an end flange of bobbin 114. Each terminal projects transversely away from bobbin 114 through cover 102B.

Electromagnet assembly 104 is securely held on container 102A by several posts 120 that are part of the injection molded enclosure 102. Each post 120 comprises a shoulder 121 spaced a certain distance from the container's bottom wall and a catch 123 spaced still farther away. The thickness of stator 109 is such that its outer margin along legs 122, 124 and side 127 can be snugly lodged between shoulders 121 and catches 123. A further post 125, that is free-standing from the container bottom wall, captures stator 109 by a catch 125A at its free end fitting over the end of middle leg 126.

Pump 50 comprises a housing 144 that includes apertured tabs at several locations on its exterior so that it can be mounted on enclosure 102 by passing threaded fasteners 141 through those tabs and tightening them in holes in the enclosure. A pumping mechanism 140 is disposed at one side of housing 144. Housing 144 comprises a circular flange 146 and a tubular wall 148 extending from flange 146 to an opposite side of the housing.

Pumping mechanism 140 comprises a movable wall 150 having a circular perimeter margin disposed against a rim 152 of flange 146. Wall 150 is shown to comprise a flexible, but fluid-impermeable, part 154 and a rigid part 156. Part 154 is a fuel-tolerant elastomeric material that is united with part 156, such as by known insert-molding methods, thereby intimately associating the two parts 154, 156 in assembly. The outer perimeter margin of movable wall 150 comprises a circular bead 158 in part 154. Rim 152 comprises a circular groove within which bead 158 is disposed. Bead 158 is held in that groove by a circular clinch ring 162 which is fitted over the abutted perimeter margins of wall 150 and flange 146 and which has an outer perimeter that is deformed and crimped onto the abutted perimeter margins of wall 150 and flange 146 in the manner shown. This serves to seal the two perimeter margins together so that a pumping chamber 164 is cooperatively defined by wall 150 and flange 146.

Pumping chamber 164 may be considered to have an axis 166 that is concentric with flange 146 and wall 150. Axis 166 is offset from an axis 168 of tubular wall 148. Tubular wall 148 comprises a passage 170 extending along axis 168 from pumping chamber 164 and opening to the interior space 103 of enclosure 102 at the side of housing 144 opposite pumping chamber 164. Housing 144 still further comprises a branch passage 172 that tees into passage 170.

One-way valve 58 is disposed between pumping chamber 164 and passage 170 to allow fluid flow in a direction from pumping chamber 164 into passage 170, but not in an opposite direction. Valve 58 comprises an elastomeric umbrella valve element 178 mounted on an appropriately apertured internal wall of housing 144 that separates pumping chamber 164 from passage 170. Spaced from valve 58 circumferentially about axis 166 is one-way valve 56, which comprises an umbrella valve element 181. Valve 56 has a construction like that of valve 58, with element 181 being mounted on a wall of housing 144 to allow fluid flow in a direction from the interior space 103 of enclosure 102 into pumping chamber 164 but not in an opposite direction.

Ports 22A, 22B are shown as respective nipples of the injection molding forming container 102A. The nipple forming port 22B is open to the interior space 103 of enclosure 102 proximately adjacent electromagnet 104 to provide continuous venting of interior space 103 to atmosphere through filter 24. The nipple forming port 22A is open to a passage 180 formed in container 102A but partitioned from interior space 103. A 90° elbow bend transitions passage 180 from the nipple forming port 22A to a first canister port 182 at the bottom wall of container 102A. Also in the bottom wall adjacent canister port 182 is a second canister port 184.

Figure 4:
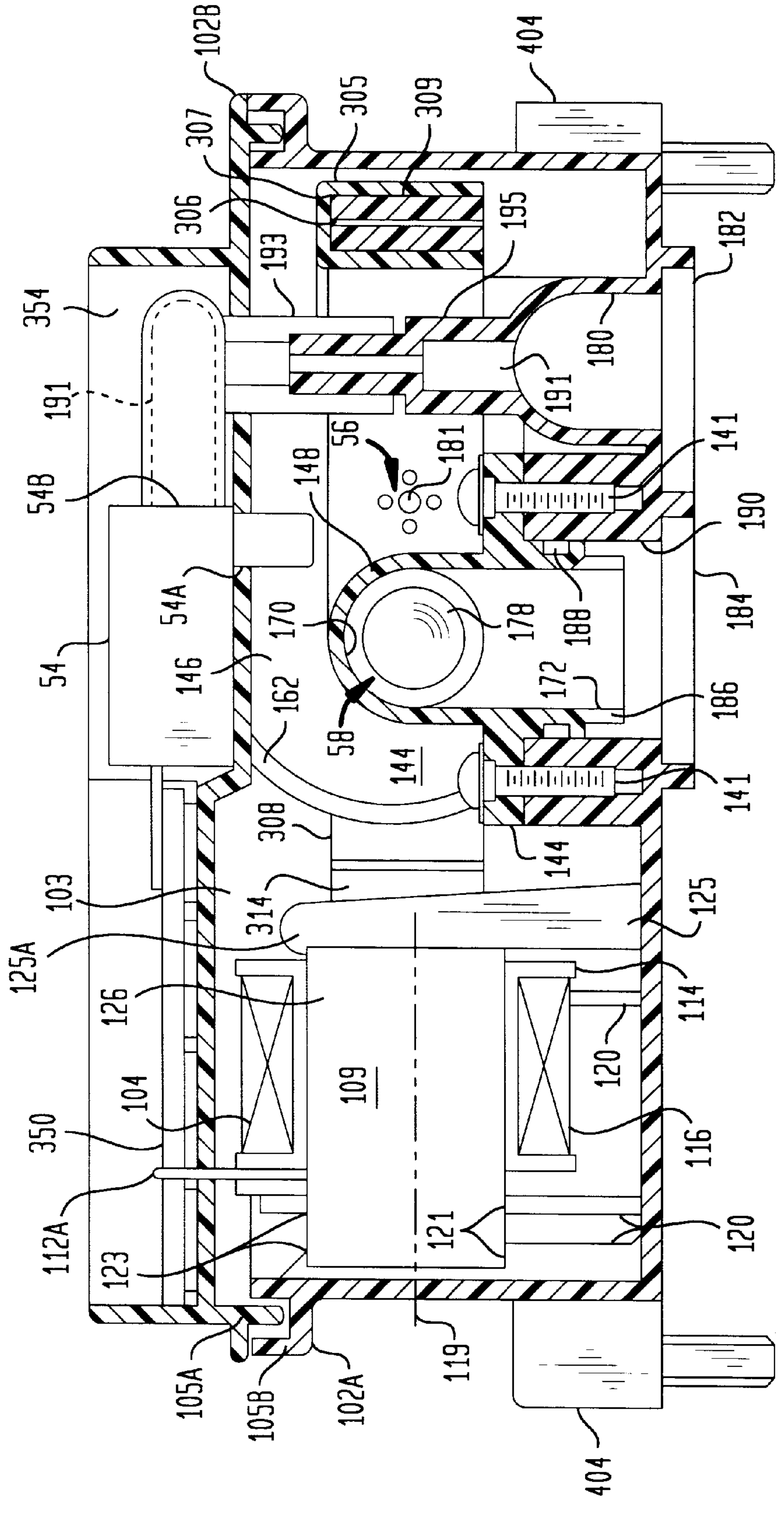
FIG. 4 is a vertical cross section view in the direction of arrows 4—4 in FIG. 3.
Figure 5:
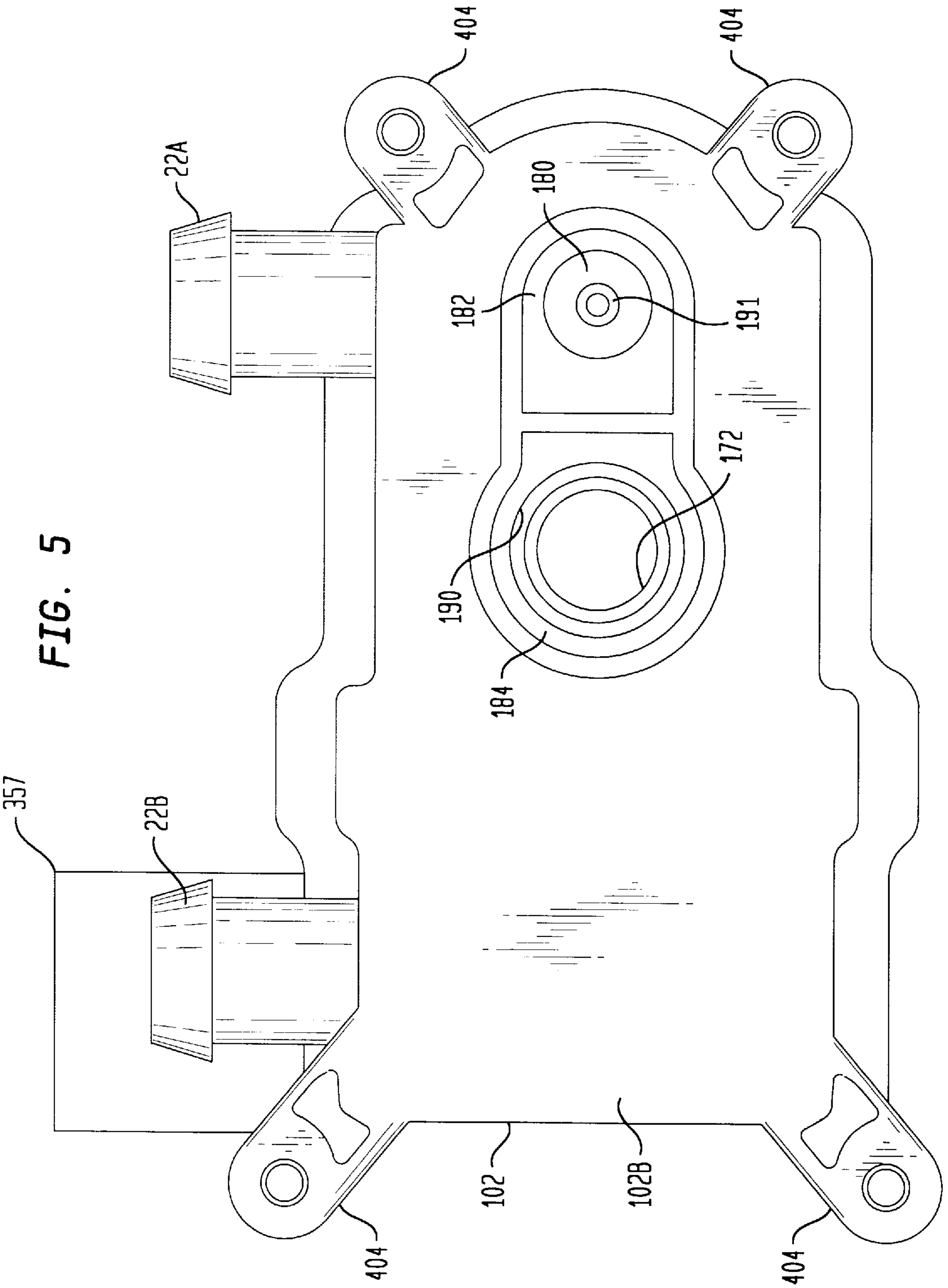
FIG. 5 is a full bottom view in the direction of arrows 5—5 in FIG. 4.
Figure 6:
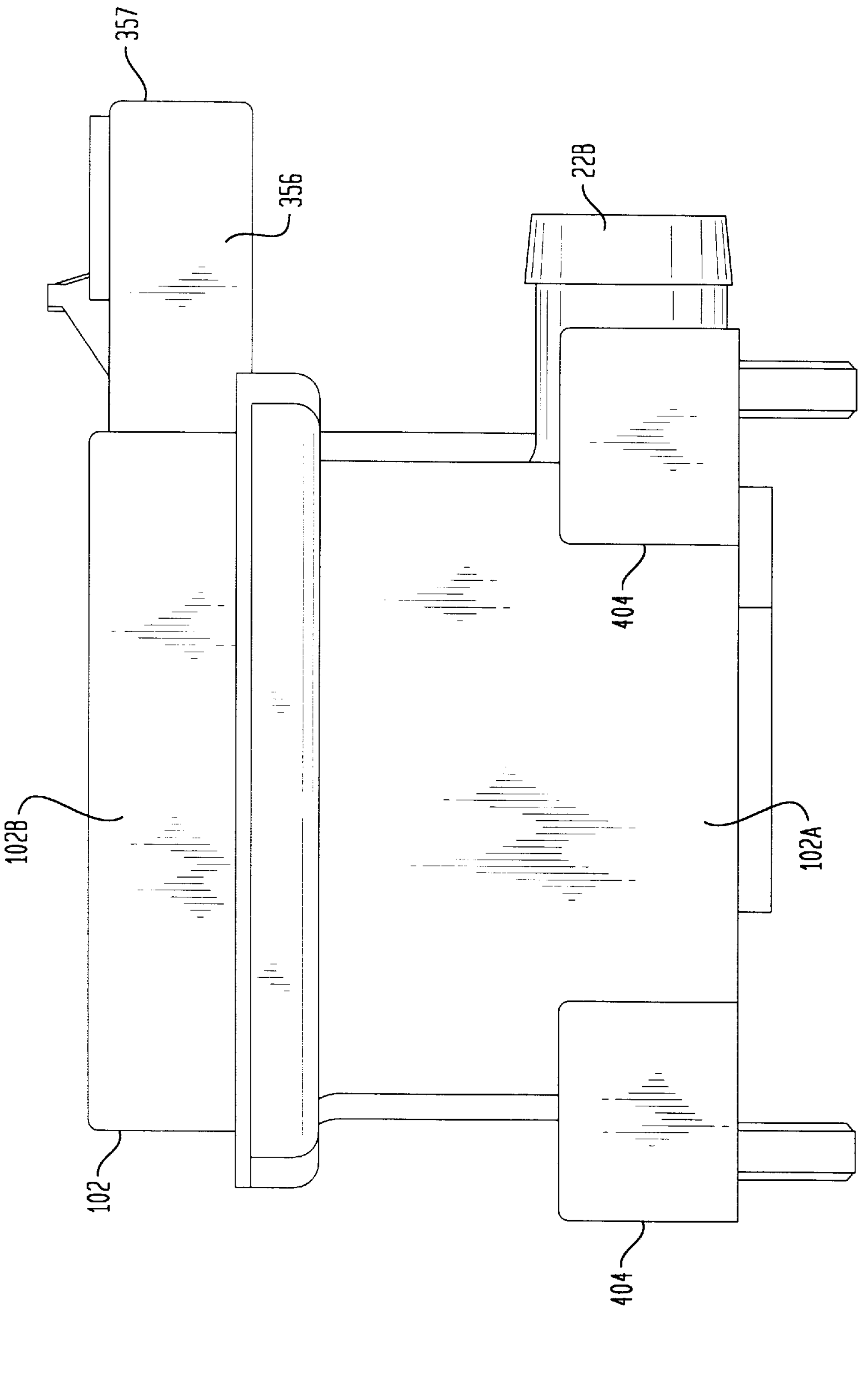
FIG. 6 is a full left side view in the direction of arrows 6–6 in FIG. 4.
Figure 7:
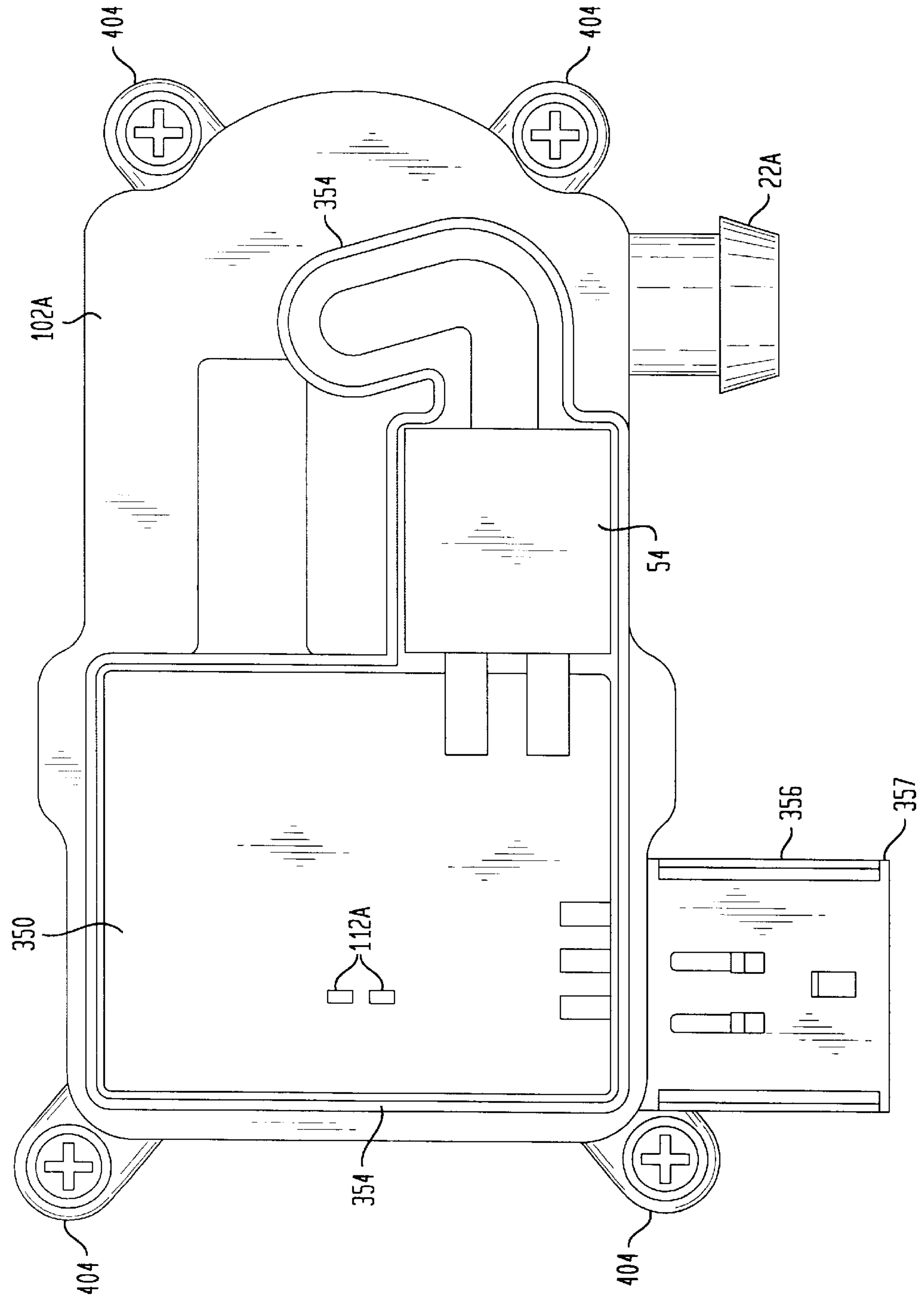
FIG. 7 is a full top view in the direction of arrows 7—7 in FIG. 4.

When LDM 22 is associated with canister 18, port 182 registers with a dirty air inlet port of the canister to place port 22A in communication with canister dirty air side 18C, and port 184, with a clean air inlet port of the canister to place branch passage 172 in communication with canister clean air side 18B. FIG. 4 shows that branch passage 172 is defined by a short tubular wall 186 depending from housing 144. An O-ring seal 188 is disposed around the exterior of wall 186 for securing fluid-tight sealing of wall 188 to that of a hole 190 extending through the bottom wall of container 102A to port 184. Measuring port 54B of pressure switch 54 is tapped into passage 180 by a tap passage 191 in enclosure 102 that is separate from interior space 103. A nipple formation 195 molded integrally into container 102A tees into passage 180 to form a portion of tap passage 191. Another portion of tap passage 191 extends from switch 54 to a tube 193 that depends from the interior of cover 102B to telescopically engage the free end of nipple formation 195 in a fluid-tight joint when cover 102B and container 102A are assembled together.

Figure 3:
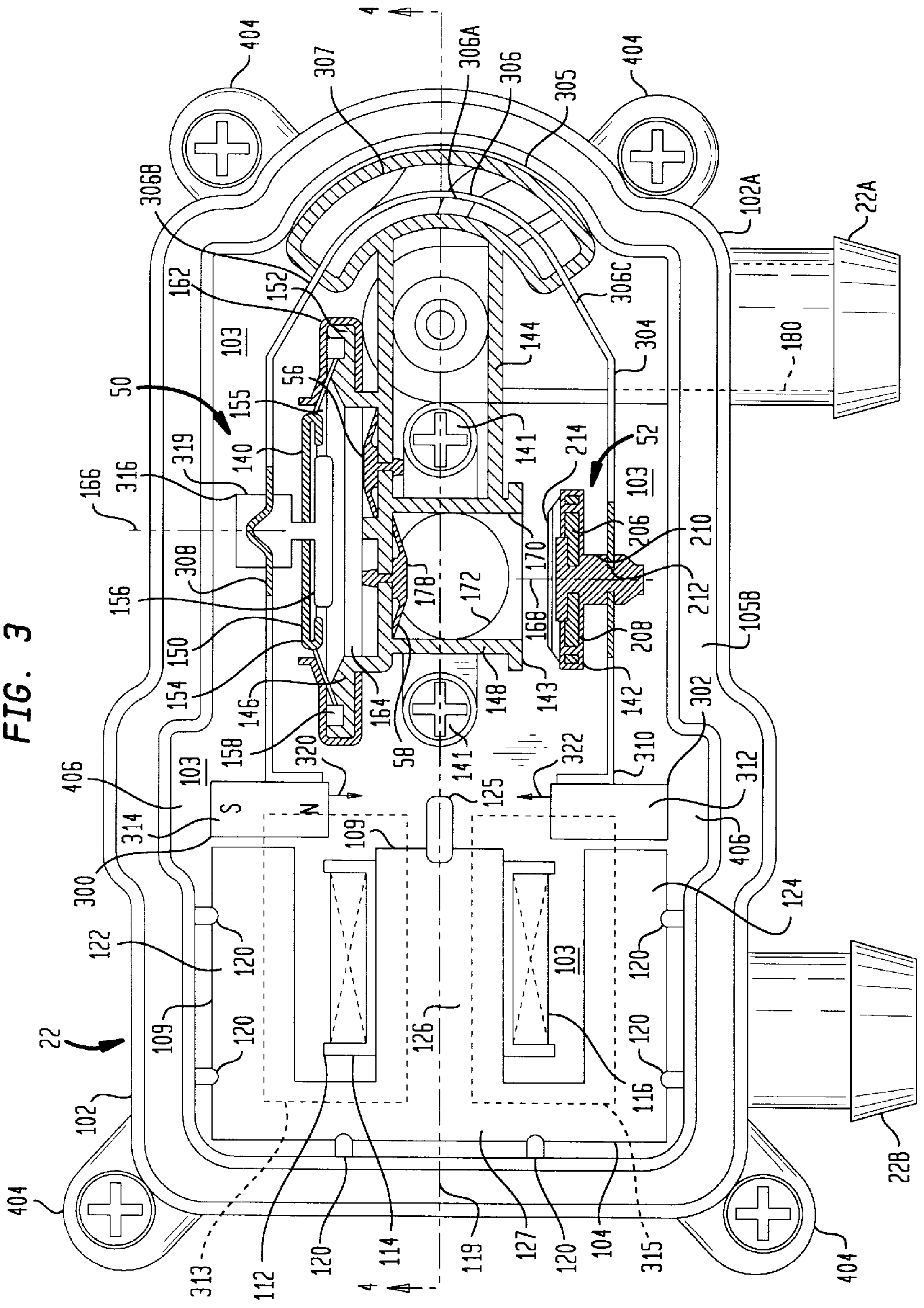
FIG. 3 is a top plan view showing the interior of an exemplary embodiment of LDM.

An armature 302 operatively couples electromagnet 104 with vent valve 52. Valve 52 comprises a closure 142 that is operated by electromagnet 104 to selectively seat on and unseat from a surface 143 of housing 144 that circumscribes passage 170 at the side of housing 144 opposite pumping chamber 164. FIG. 3 shows closure 142 in unseated position, opening passage 170 to interior space 103; this is the open position of valve 52 that is assumed when armature 302 is not being actuated by energization of electromagnet 104.

An armature 300 operatively couples electromagnet 104 with pumping mechanism 140. FIG. 3 shows the position assumed when armature 300 is not being actuated by energization of electromagnet 104 to operate pumping mechanism 140.

The illustrated embodiment shows armatures 300, 302 sharing several common parts. These parts include a formed metal spring strip 304 and a mount 305 for mounting the spring strip on a portion of pump housing 144. Spring strip 304 comprises a metal band that is formed to a U-shape comprising a base 306 and two sides 308, 310 extending from opposite ends of base 306. A central portion 306A of base 306 has a smooth arcuate curvature from whose ends extend short straight segments 306B, 306C. Respective bends join these respective short straight segments with respective sides 308, 310. FIG. 3 shows sides 308, 310 to be generally straight and parallel when neither armature 300, 302 is being operated by electromagnet 104.

Armature 302 comprises a ferromagnetic slug 312, preferably magnetically soft iron, affixed to the distal end of side 310, and armature 300, a permanent magnet 314 affixed to the distal end of side 308. Closure 142 mounts on side 310 proximal to slug 312. Closure 142 comprises a rigid disk 206, stamped metal for example, onto which elastomeric material 208 has been insert molded so that the two are intimately united to form an assembly. The elastomeric material forms a grommet-like post 210 that projects perpendicularly away from, and to one axial side of, the center of disk 206. Post 210 comprises a shape, including an axially central groove 212, providing for the attachment of closure 142 to side 310 by inserting the free end of post 210 through a hole in side 310 to seat the hole's margin in groove 212. At the outer margin of disk 206, the elastomeric material is formed to provide a lip seal 214 that is generally frustoconically shaped and canted inward and away from disk 206 on the axial side of the disk opposite post 210.

The positions of the various parts of LDM 22 shown in FIG. 3 represent a condition where the LDM is in its inactive state. Slug 312 is disposed proximate, but spaced from, the free ends of legs 124, 126, and magnet 314, proximate, but spaced from, the free ends of legs 122, 126. The combination of slug 312, leg 124, a portion of leg 126, and the portion of side 127 joining the proximal ends of legs 124, 126 form a magnetic circuit 315 for operating valve 52. The combination of magnet 314, leg 122, a portion of leg 126, and the portion of side 127 joining the proximal ends of legs 122, 126 form a magnetic circuit 313 for operating pumping mechanism 140.

FIG. 3 discloses that in the inactive state of LDM 22, slug 312 is disposed asymmetric to the free ends of legs 124, 126, and consequently, vent valve 52 is open. This causes the evaporative emission space to be vented to atmosphere through a vent path comprising port 184, an adjoining portion of hole 190, branch passage 172, a portion of passage 170, interior space 103, port 22B, fluid passage 30, and filter 24.

FIG. 3 further discloses that magnet 314 is disposed asymmetric to the free ends of legs 122, 126. At a location spaced proximal to magnet 314, a joint 316 operatively connects strip 304 to movable wall 150 of pumping mechanism 140. This joint comprises a dimple in side 308 that seats the tip end of a complementary shaped post projecting from part 156 along axis 166, and a clip 319 maintaining the seated relationship.

In the inactive state of LDM 22, spring strip 304 assumes a relaxed condition in which sides 308, 310 are unflexed.In the LDM's active state however, electromagnet assembly 104 is effective to resiliently flex side 310 to close vent valve 52, and to resiliently oscillate side 308 to operate pumping mechanism 140.

Spring strip 304 has a thickness oriented in the plane of FIG. 3 and a width oriented in the plane of FIG. 4. Mounting 305 comprises an elastomeric grip 307 engaging base 306. Grip 307 is in covering relation to at least opposite faces of the width of strip 304, and as viewed in FIG. 3, has a generally uniform thickness. An end of housing 144 opposite wall 148 comprises a curved trough 309 whose curvature matches that of grip 307 and whose width is related to that of grip 307 to allow the latter to be securely held therein, as shown. Opposite ends of trough 309 confine grip 307, but comprise slits that allow strip 304 to pass through.

Mount 305 therefore serves to cantilever-mount each side 308, 310 of spring strip 304. From the relaxed position shown by FIG. 3, side 308 can flex in the direction indicated by the arrow 320, and side 310, in the direction indicated by the arrow 322. Flexing of side 308 is caused by the energization of magnetic circuit 313, and flexing of side 310, by the energization of magnetic circuit 315.

Magnet 314 is portrayed as comprising a South magnetic pole and a North magnetic pole spaced apart in the general direction of arrow 320. Because of the asymmetry of the magnet and its poles relative to the distal ends of legs 122, 126, energization of coil 116 which causes the distal end of leg 122 to become a South magnetic pole and the portion of the distal end of leg 126 proximate the distal end of leg 122 to become a North magnetic pole, will create a force on magnet 314 in the general direction of arrow 320. A sufficiently large force will flex side 308 in the manner described, causing an amplified force to be applied to pumping mechanism 140 through joint 316 because the cantilever mounting of side 308 acts similar to a second class lever.

The application of such a force to pumping mechanism 140 causes movable wall 150 to execute a pumping stroke, or downstroke, as side 308 flexes. Such stroking causes a charge of air that is in pumping chamber 164 to be compressed, and thence a portion of the compressed charge expelled through valve 58. An annular zone 155 of elastomeric part 154 that lies radially between bead 158 and insert 156 limits the downstroke by abutting a frustoconical surface of housing 144 within pumping chamber 164. When the electric current in coil 116 changes in such a way that the magnetic field that caused side 308 to flex collapses, or even reverses, side 308 will return toward its relaxed position. In doing so, it operates movable wall 150 in a direction away from pumping chamber 164, executing a charging stroke, or upstroke. During the upstroke, valve 58 remains closed, but a pressure differential across valve 56 causes the latter valve to open. Now atmospheric air from interior space 103 can enter pumping chamber 164 through valve 56. An upstroke is limited by abutment of annular zone 155 with a radially overlapping frustoconically shaped surface of clinch ring 162. When that occurs, a charge of air will have once again been created in pumping chamber 164, and concurrently valve 56 will have closed due to lack of sufficient pressure differential to maintain it open. Thereupon, pumping mechanism 140 is once again ready to commence an ensuing downstroke. By using zone 155 to limit the stroke of the pumping mechanism, the reciprocal motion of the pump is cushioned, thereby promoting attenuation of noise and vibration.

When LDM 22 is in its inactive state, slug 312 has asymmetry relative to the distal ends of legs 122, 124. Slug 312 is preferably a magnetically soft material. Energization of coil 116 which causes the distal end of leg 124 to become a magnetic pole of one polarity and the portion of the distal end of leg 126 proximate the distal end of leg 124 to become a magnetic pole of opposite polarity, will create a force on slug 312 in the general direction of arrow 322. A sufficiently large force will flex side 310 in the manner described, causing an amplified force to operate valve 52 from open to closed because the cantilever mounting of side 310 acts similar to a second class lever. Closure 142 is thereby forced to seal the open end of passage 170 closed due to the action of lip seal 214 with the surface of housing 144 around the open end of passage 170. Consequently, the evaporative emission space ceases to be vented to atmosphere because the vent path through vent valve 52 has now been closed.

A circuit board assembly 350 is disposed on the exterior of cover 102B adjacent switch 54, and the two are laterally bounded by a raised perimeter wall 354 that is a part of the cover. Terminals of switch 54 connect with certain circuits on circuit board assembly 350, as do terminals 112A of electromagnet 112. A surround 356 protrudes from the outside of wall 354 at one side of enclosure 102. External end portions of electric terminals that may provide for connection of switch 54 and coil 116 directly with EMC 16 protrude from circuit board assembly 350 where they are bounded by surround 356 to form an electric connector 357. A complementary connector (not shown) that forms one termination of the connection represented by the reference numeral 38 in FIG. 1 mates with connector 357. When a leak detection test is to be performed, EMC 16 operates LDM 22 to the active state and operates PPS valve 20 closed. Circuit board assembly 350 may however contain electric circuits associated with coil 116 and switch 54 for performing tests and diagnostic procedures independent of commands from EMC 16, storing test data, and conveying stored test data to EMC 16. Both circuit board assembly 350 and switch 54 are encapsulated from the outside environment by filling the space bounded by perimeter wall 354 with a suitable potting compound to a level that covers both.

In the active state of LDM 22, electromagnet assembly 104 is energized by an electric driver circuit (to be described in detail with reference to FIGS. 21 and 22) that delivers to coil 116 an electric signal input that may be considered to comprise two components: namely, a first signal component that closes vent valve 52 by energizing magnetic circuit 315 such that a force is exerted on slug 312, which force, in conjunction with the force vs. deflection characteristic of side 310, the inertial mass of armature 302 disposed about mount 305, and any pressure differential acting on closure 142, is effective to seal closure 142 closed against the open end of passage 170 and to maintain that relationship while LDM 22 continues to be in its active state during the test; and a second signal component that energizes magnetic circuit 313 such that a force is exerted on magnet 314, which force is effective to oscillate side 308, and thereby stroke pumping mechanism 140, while the evaporative emission space under test ceases to be vented to atmosphere through LDM 22 due to valve 52 having been closed. Electromagnet assembly 104 therefore comprises a single solenoid coil 116 through which the electric control current flow is conducted to create magnetic flux in circuit 313 for operating pump 50 and magnetic flux in circuit 315 for operating vent valve 52.

Once a leak detection test commences, pumping mechanism 140 is repeatedly stroked until pressure suitable for performing the test has been created in the evaporative emission space under test. A test comprises monitoring an operating parameter representative of evaporative emission space pressure. One method of monitoring comprises utilizing pressure switch 54 to sense pressure. Reference port 54A of switch 54 is communicated to interior space 103 by a nipple that extends through the wall of cover 102B in a sealed manner. Switch 54 comprises a set of contacts that are normally in a first state, open for example. The switch contacts will remain in that state until the evaporative emission space pressure, as sensed by measuring port 54B, exceeds the switch setting, approximately 4 inches of water as one example, whereupon the contacts will switch to a second state, closed for example. If leakage from the evaporative emission space is present, the pressure will then begin to decay. The switch contacts will revert to their first state after a certain amount of the test pressure has been lost.

Figure 8:
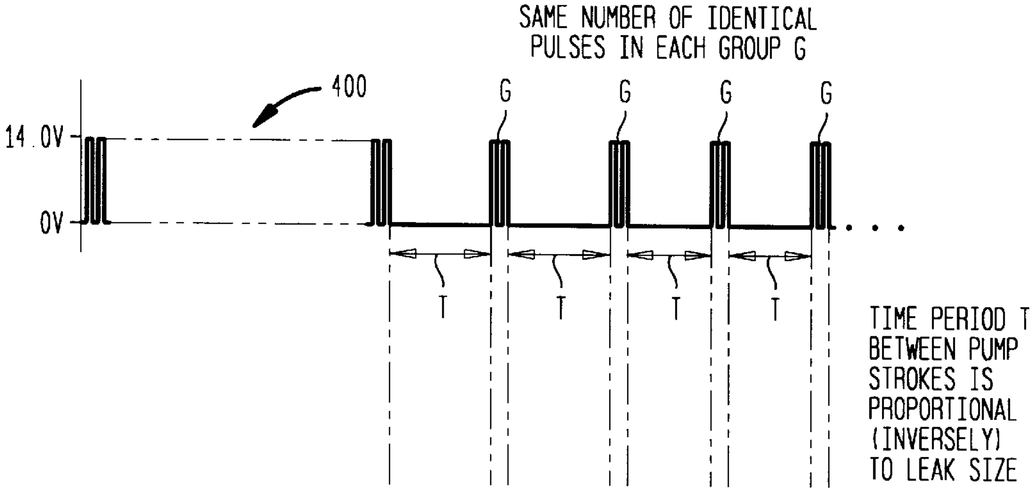
FIG. 8 is a graph plot useful in explaining operation.
Figure 9:
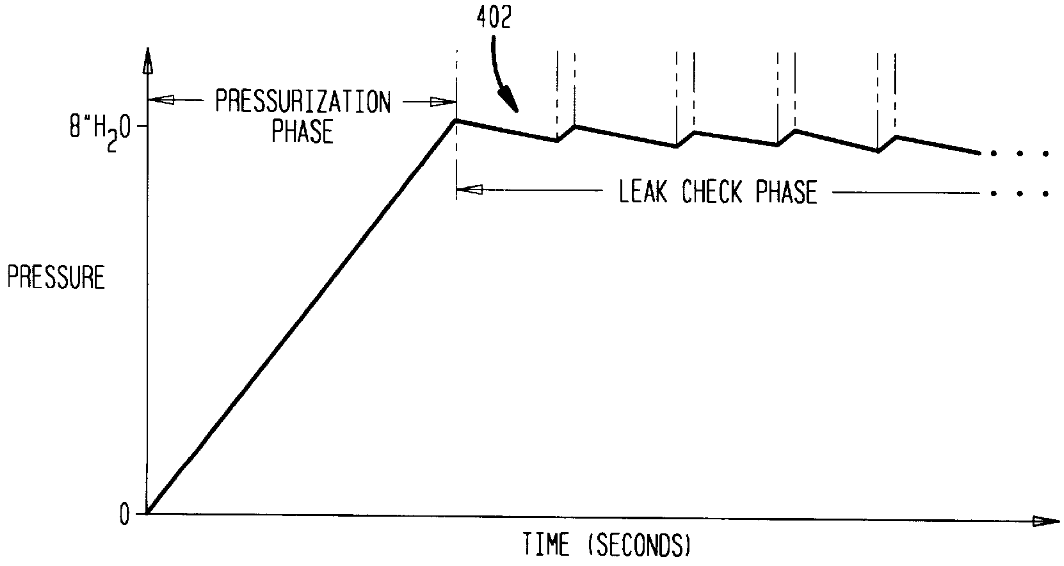
FIG. 9 is another graph plot useful in explaining operation.

The graph plots of FIGS. 8 and 9 show a representative test procedure when some leakage is present. Graph plot 400 depicts the second component of an electric signal input to coil 116 as a function of time. Graph plot 402 depicts the corresponding pressure differential sensed by switch 54. Initially, the second component of the electric signal input comprises a continuously repeating pulse that continuously operates pump mechanism 140 to progressively increases the pressure in the evaporative emission space under test. Once the pressure has exceeded the setting of switch 54, the switch contacts change state, interrupting the second component of the electric signal input and stopping pump mechanism 140. Leakage will be evidenced by ensuing pressure decay. Upon occurrence of an amount of decay sufficient to cause switch 54 to revert to its first state, EMC 16 pulses coil 116 with a fixed number of pulses, once again operating pumping mechanism 140. This will increase the evaporative emission space test pressure sufficiently to exceed the pressure setting of switch 54.

This cycle of allowing the test pressure to decay and then re-building it is repeated until it assumes substantially stable steady state operation. Such operation is evidenced by the pulsing of pump mechanism 140 comprising a regularly repeating group G of a certain number of pulses. The intervening interrupt times between pulse groups T will be substantially equal at stability. A measure of the durations of the stabilized interrupt times T indicates the size of the leak. The smaller the interrupt times, the larger the leak, and vice versa. Any statistically accurate method for processing the interrupt time measurements to yield a final leak size measurement may be employed. For example, a number of interrupt times may be averaged to yield the leak size measurement. At the conclusion of the test, LDM 22 is returned to its inactive state by terminating electric current flow to coil 116.

An exemplary LDM 22 may operate pump mechanism 140 with 50 hertz, 50% duty cycle pulses. The volume of pumping chamber 164 relative to the hysteresis of switch 54 may allow for a pulse group G to comprise a relatively small number of pulses, say one to five pulses for example. Because pump mechanism 140 is a positive displacement mechanism that is charged to a given volume of atmospheric pressure air at the beginning of each stroke, a full pump downstroke delivers a known quantity of air. Because the described process for obtaining a leak size measurement is based on flowing known amounts of air, it is unnecessary for the measurement to be corrected for either volume of the evaporative emission space under test or any particular pressure therein.

Figure 10:
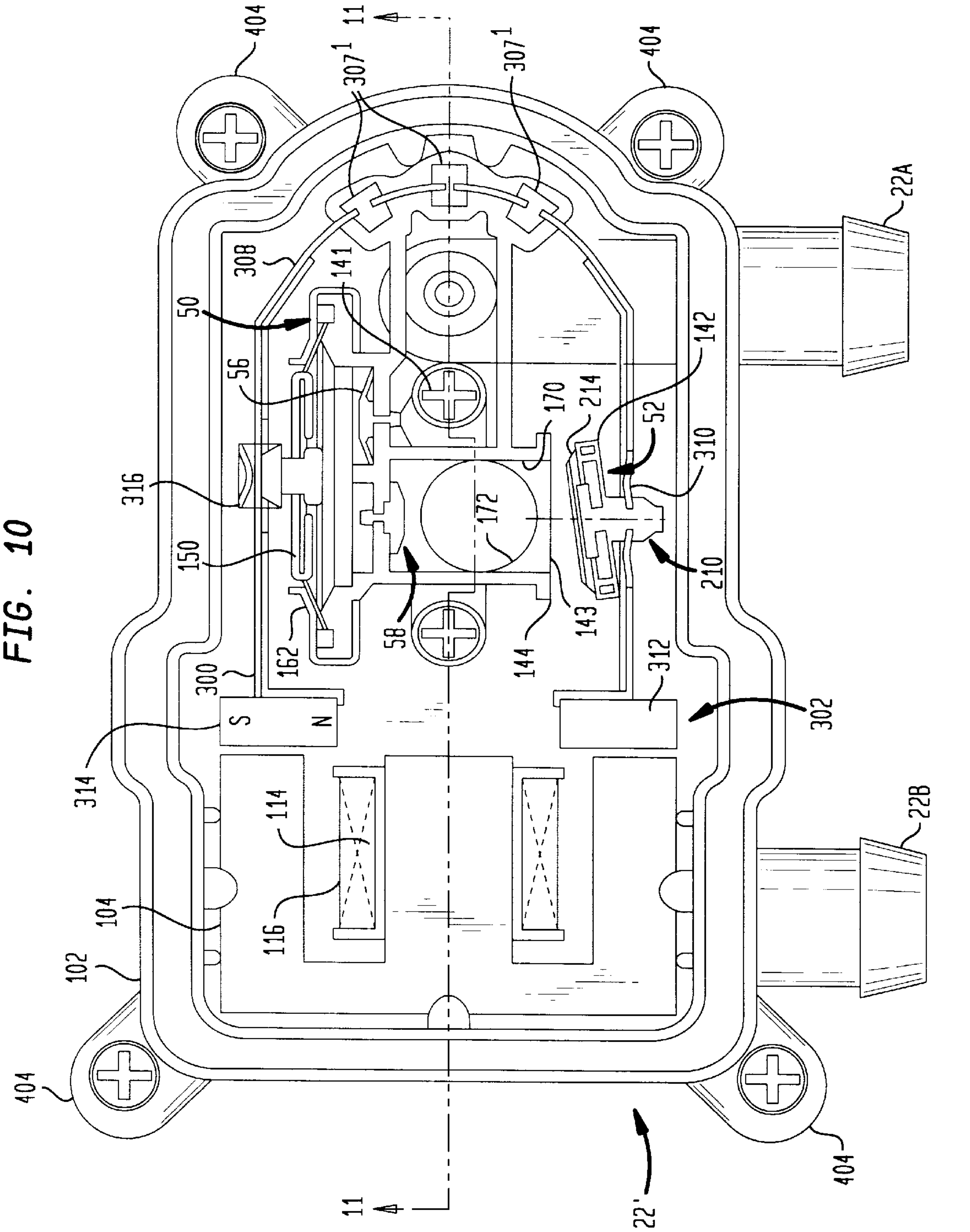
FIG. 10 is a view similar to FIG. 3 showing a second embodiment.
Figure 11:
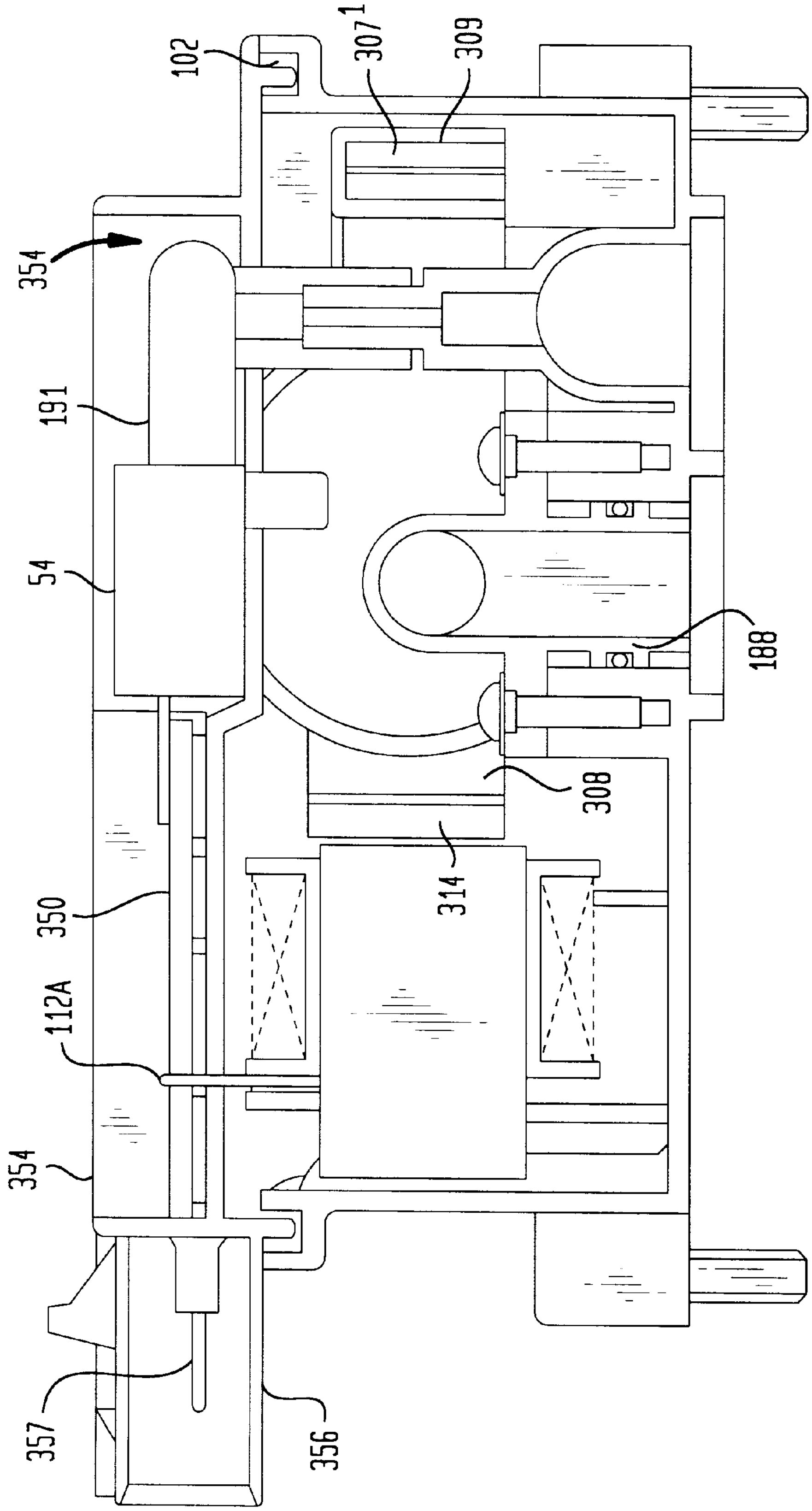
FIG. 11 is a view similar to FIG. 4 showing the second embodiment.

LDM 22' of FIGS. 10 and 11 is like LDM 22 of FIGS. 3–7, and the same reference numerals are used in all such Figures to designate similar parts. LDM 22' possesses some differences however. The axis of post 210 is made non-perpendicular to the length of side 310 such that when closure 142 is closing the open end of passage 170, the post's axis is substantially perpendicular to surface 143 of housing 144 against which lip 214 seals. Rather than employing a single grip 307, LDM 22' comprises three discrete grips 307' disposed in discrete slots that are spaced apart along the curvature of the mounting trough 309. There are also slight differences in the securing of stator 109 on enclosure 102, in the shape of spring strip 304, in the location of connector 357, and in the construction of joint 316. In both LDM's, enclosure 102 comprises apertured tabs 404 on its exterior for fastening to canister 18, and the opposite side walls of the enclosure comprise small alcoves 406 to allow for potential overshooting of magnet 314 and slug 312 when sides 308, 310 relax from flexed positions.

Although the embodiments of the drawing Figures are for leak detection systems that create positive test pressures relative to atmospheric pressure, they are adaptable to negative pressure leak detection systems. By reversing the directions of one-way valves 56, 58, and by reversing the ports of switch 54, negative test pressures can be developed and sensed.

Figure 12:
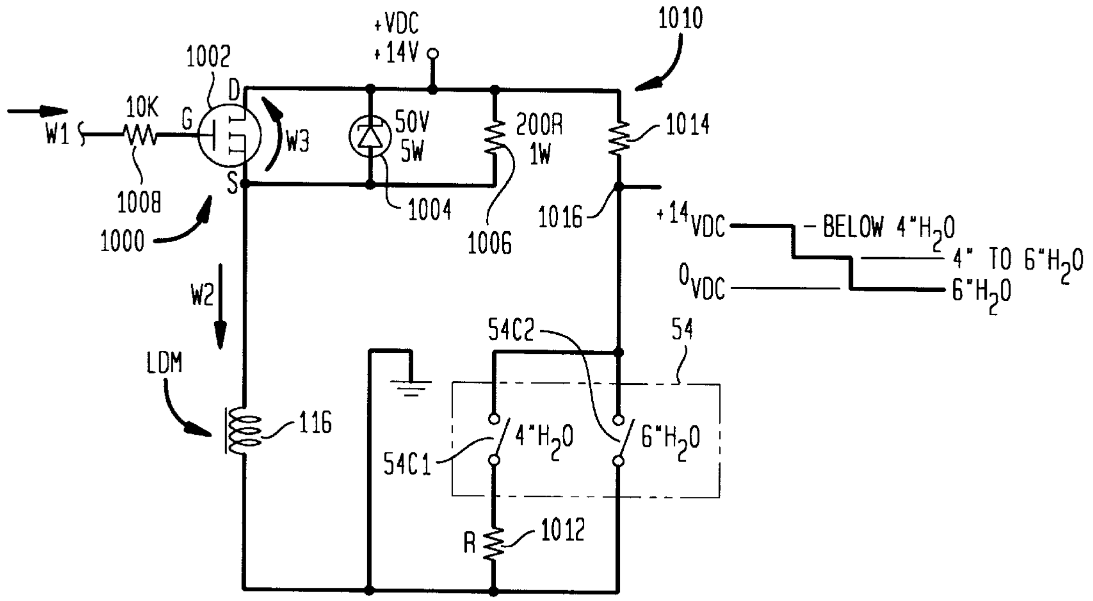
FIG. 12 is a schematic diagram of an electric circuit for operating a leak detection module.
Figure 13:
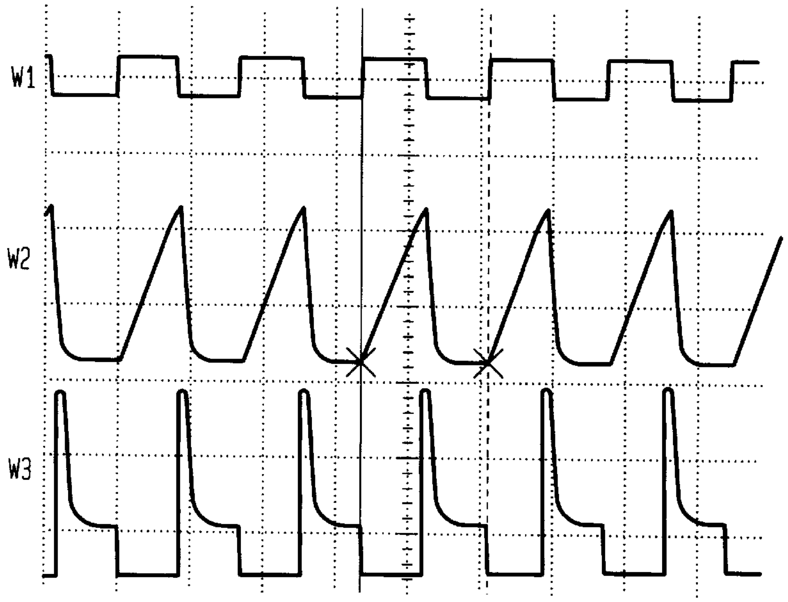
FIG. 13 is a series of waveforms useful in explaining the operation of the circuit of FIG. 12.

Driver circuit 1000 is shown in FIG. 12, and related waveforms in FIG. 13. Circuit 1000 comprises a three terminal, solid state semiconductor switching device, such as a field effect transistor (FET) 1002, a zener diode 1004, and two resistors 1006, 1008. These circuit components are electrically connected as shown and in association with a D.C. power supply voltage, +VDC as referenced to ground. The D.C. power supply voltage is derived ultimately from the vehicle's own electrical power system, for example +14 VDC as indicated. When FET 1002 is conductive, it provides a current path from the D.C. power supply to coil 116. At all times resistor 1006 provides a current path from the D.C. power supply to the coil.

FIG. 13 shows a control voltage signal waveform W1 for operating FET 1002. A second waveform W2 shows electric current that flows through electromagnet coil 116 in response to waveform W1. A third waveform W3 shows the voltage waveform that appears between the drain and source of FET 1002 as the FET is being operated by waveform W1.

Waveform W1 is shown to comprise a series of rectangular voltage pulses applied through resistor 1008 to the gate of FET 1002. Collectively, the waveforms show that upon FET 1002 being switched into full conductivity in response to a pulse of signal waveform W1 the current flow through coil 116 begins to build. When a pulse of signal waveform W1 ends, the current falls off with extreme rapidity, falling at a rate noticeably greater than the rate at which it had just been building.

The presence of zener diode 1004 affords a modicum of voltage protection for FET 1002. Upon FET 1002 being switched into non-conductivity condition, zener diode 1004 becomes effective to limit the voltage that can appear between the drain and source terminals of FET 1002 to the breakdown voltage rating of the zener diode, 50 volts, as noted in the schematic.

Resistor 1006 assures that the current flow through coil 116 will not fall below a certain threshold. When FET 1002 assumes a state of non-conductivity where it does not conduct current from the D.C. power supply to coil 116, threshold current continues to be delivered to coil 116 through resistor 1006.

As each pulse of waveform W1 causes current to build in coil 116 during the corresponding pulse interval, that current creates a force that is applied to the pumping mechanism of the LDM by the corresponding electromagnetic actuator mechanism of the LDM that operates the pumping mechanism. That force causes the pumping mechanism to execute a pumping stroke, or downstroke. During the interval between pulses, the rapid dissipation of the current to the threshold value results in a corresponding dissipation in force that allows spring return of the pumping mechanism to execute a charging stroke that draws a new charge of air into the pumping chamber. It is in this manner that driver circuit 1000 efficiently operates pump 50.

By utilizing resistor 1006 to maintain current in coil 116 at the threshold level, sufficient force is maintained throughout a leakage test for the electromagnetic actuator mechanism associated with vent valve 52 to hold the vent valve closed.

The electric current input from driver circuit 1000 to coil 116 may be therefore be considered to comprise a first electric current component for operating the pump and a second for operating the vent valve. Both current components are conducted through the entire coil winding via only two electric terminals, namely terminals 112A.

When a leak test is to be performed, circuit 1000 is energized by applying the +14 VDC supply voltage to it, and by using waveform W1 to operate FET 1002. Vent valve 52 is operated closed, and pump 50 operates to build pressure in the evaporative emission space under test.

A sensing circuit 1010, also shown in FIG. 12, is associated with switch 54, and may be provided as a portion of the circuitry on circuit board 350. FIG. 12 also shows detail of a pressure switch 54 of the type that performs switching functions at different sensed pressures. In the example shown, the sensor has two switch contacts 54C1, 54C2 that are normally open, but that operate closed at respective different pressures. Contacts 54C1 are open when the sensed pressure is below four inches water, and closed above four inches water pressure. Contacts 54C2 are open when the sensed pressure is below six inches water, and closed above six inches water pressure. One side of contacts 54C2 is connected directly to ground while a corresponding side of contacts 54C1 is connected through a resistor 1012 to ground. The other sides of the two contacts are connected in common to one side of a resistor 1014 of sensing circuit 1010. The other side of resistor 1014 is connected to the positive terminal of the DC supply.

As long as the pressure sensed by sensor 54 is below four inches water, both contacts 54C1, 54C2 remain open, and no current flows through resistor 1014. When the pressure sensed by sensor 54 is above four inches water but below six inches water, contacts 54C1 are closed and 54C2 are open, causing current to flow serially through resistors 1012 and 1014. The two resistors form a voltage divider that provides a voltage signal at their common junction 1016. When the pressure sensed by sensor 54 is above six inches water both contacts 54C1, 54C2 are closed, and this effectively grounds resistor 1014 because the current flow through resistor 1014 is shunted from resistor 1012 by the closing of contacts 54C2.

Therefore, circuit 1010 can provide, at junction 1016, a signal having three distinct states: a first state of +VDC when sensed pressure is below four inches water; a second state of a voltage intermediate zero and +VDC when the sensed pressure is between four and six inches water; and a third state of zero volts when sensed pressure is above six inches water. A graph that depicts this is adjacent circuit 1010 in FIG. 12. Each set of switch contacts possesses a certain hysteresis in its switching characteristic.

In view of previous description, it can be understood that the sensed signal from circuit 1010 controls the operation of pump 50 during a test. When a test begins, the waveform W1 operates the pump to build pressure. As the pressure increases through four inches water, the sensed signal at junction 1016 changes from the first to the second state. Should the sensed pressure reach six inches water, the sensed signal changes from the second to the third state. Vent valve 52 remains closed during the test.

If leakage is present, pressure decay will occur. Any particular manner of using the various states of the signal output of circuit 1010 will depend on the particular test methodology employed. For example, contacts 54C1 may be used in the methodology described earlier with reference to FIGS. 8 and 9. Contacts 54C2 may be used for sensing a higher pressure condition, such as a pressure spike that occurs when the fuel tank is being refueled by a nozzle inserted into a filler tube of the fuel tank. Occurrence of such a pressure spike may be used to abort a leak test that is being concurrently conducted. When the test concludes, power is removed so that vent valve 52 reopens.

It is to be understood that because the invention may be practiced in various forms within the scope of the appended claims, certain specific words and phrases that may be used to describe a particular exemplary embodiment of the invention are not intended to necessarily limit the scope of the invention solely on account of such use.

What is claimed is:

1. An evaporative emission leak detection system for detecting leakage from an evaporative emission space of a fuel system of an automotive vehicle comprising:

a pump comprising a reciprocal pumping mechanism for pumping gaseous fluid with respect to an evaporative emission space;

a vent valve that is selectively operable to a first state that vents the evaporative emission space to atmosphere and to a second state that does not vent the evaporative emission space to atmosphere; and an electromechanical actuator for operating both the pump and the vent valve comprising, an electric device comprising an electromagnetic coil for receiving an electric control signal for controlling operation both of the pump and of the vent valve, a first electromechanical coupling operatively coupling the device with the pump such that the pump operation is controlled by the electric control signal, and a second electromechanical coupling operatively coupling the device with the vent valve such that the vent valve operation is also controlled by the electric control signal;

including an electric circuit providing the electric control signal to the coil wherein the electric circuit comprises a first current path to the coil comprising a controlled conduction device that is connected in series circuit relationship with the coil and is cycled alternately between different states of conductivity to reciprocate the reciprocal pumping mechanism of the pump, and a second current path to the coil comprising an electric circuit component for maintaining a threshold electric current in the coil.

2. A system as set forth in claim 1 in which the electric circuit component for maintaining a threshold electric current in the coil comprises a resistor for maintaining threshold electric current in the coil when no current flows through the first path.

3. A system as set forth in claim 2 in which the controlled conduction device comprises a semiconductor.

4. A system as set forth in claim 3 in which the semiconductor comprises a field effect transistor, and the circuit further comprises a zener diode connected between drain and source terminals of the field effect transistor for limiting the magnitude of reverse voltage across the drain and source terminals of the field effect transistor.

5. A system as set forth in claim 1 in which the electric circuit component comprises a resistor, and the controlled conduction device comprises a semiconductor switch.

6. A system as set forth in claim 1 including a sensing circuit for providing a sensed signal representative of pressure in the evaporative emission space and controlling operation of the controlled conduction device in accordance with the sensed signal.

7. A system as set forth in claim 6 in which the sensed signal controls the application of a pulse waveform signal to the controlled conduction device.

8. A system as set forth in claim 7 in which the pulse waveform causes the pumping mechanism to execute a pumping stroke during a pulse of the waveform and to execute a charging stroke between pulses.

* * * * *